United States Patent [19]

Mendle et al.

[11] Patent Number: 4,464,902

[45] Date of Patent: Aug. 14, 1984

[54] PLURAL TURBOCHARGERS HAVING A COMMON EXHAUST HOUSING

[75] Inventors: Hans Mendle, Friedberg; Rudolf Bandel, Augsburg; Hanns-Günther Bozung, Neusäss, all of Fed. Rep. of Germany

[73] Assignee: M.A.N. Maschinenfabrik Augsburg-Nürnberg Aktiengesellschaft, Augsburg, Fed. Rep. of Germany

[21] Appl. No.: 353,888

[22] Filed: Mar. 2, 1982

[30] Foreign Application Priority Data

Mar. 5, 1981 [DE] Fed. Rep. of Germany ....... 3108288

[51] Int. Cl.³ ............................................. F02B 37/00
[52] U.S. Cl. ....................................... 60/612; 60/605; 415/102
[58] Field of Search ................. 60/597, 598, 612, 605; 417/407; 415/95, 102, 205

[56] References Cited

U.S. PATENT DOCUMENTS

| 535,467 | 3/1895 | Swain | 415/95 |
| 1,405,090 | 1/1922 | Baumann | 415/102 |
| 2,305,295 | 12/1942 | Lang et al. | 60/605 |
| 3,221,491 | 12/1965 | Roenig et al. | 60/597 |

FOREIGN PATENT DOCUMENTS 645393 10/1928 France ................................ 415/102

Primary Examiner—Michael Koozo
Assistant Examiner—Peggy A. Neils

[57] ABSTRACT

The twin exhaust-gas-powered turbines (9, 10) driving intake air compressors (1, 2) for an internal-combustion engine are connected together and mounted on central support brackets (47, 48) by a common turbine discharge housing (20) that deflects the discharge of each turbine separately towards an outlet funnel (24) with the help of a guiding structure that contains a median wall (33). Diffuser horns (31, 32) and hollow central plugs provide, in a short axial distance, for establishing a static pressure for causing the gas to flow with uniform pressure distribution out through the discharge funnel (24). The latter portion of the outflow path is enlarged by side pieces (26, 27) fitting over holes in the central piece (20) of the discharge casing through which the diffuser horns (31, 32) protrude with ample spacing from other components. The static pressure just mentioned creates a back pressure that improves the efficiency of the turbo-superchargers in their extraction of dynamic energy from the exhaust gas stream. The air compressors are provided with a "floating" suspension from brackets (49, 50) that is tolerant of thermal expansion.

13 Claims, 4 Drawing Figures

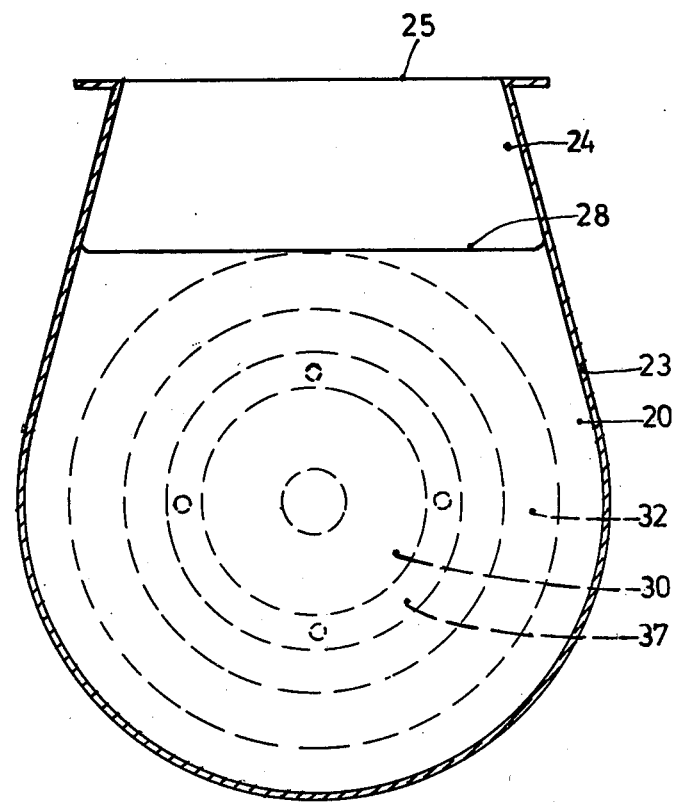
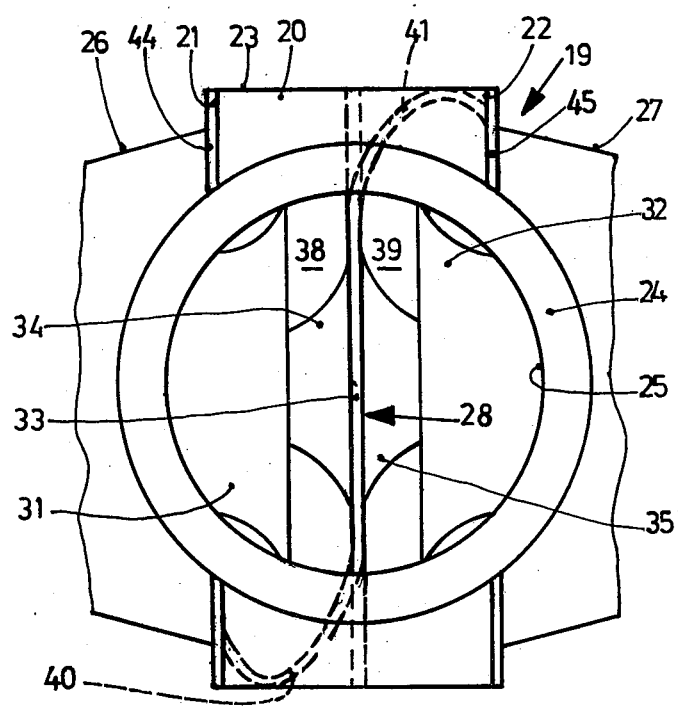

PLURAL TURBOCHARGERS HAVING A COMMON EXHAUST HOUSING

This invention concerns a supercharger system for an internal-combustion engine in the form of a twin unit mounted on the engine comprising two axially aligned combinations each containing a radial compressor and a radial turbine driven by engine exhaust gas. More particularly, these components are mounted in alignment by support elements fastened to the engine and the exhaust gases issuing from both turbines are guided by the support structure into a common turbine discharge casing disposed between the two exhaust-powered turbo-superchargers. The supporting structure also provides for connecting the two-turbo-superchargers together.

An internal combustion engine supercharged in the manner just described is disclosed in German utility model No. 7,004,611. The turbine discharge casing of that disclosure is plainly composed only of two bent tubes faired into each other, with the discharge opening having a round cross section. A relatively expensive supporting skeleton is provided for affixing the turbo-supercharger to the engine.

THE INVENTION

It is the object of the invention to provide an engine-mounted twin supercharger with smaller space requirements, more favorable configuration for the outflow of exhaust gases and the greatest possible recovery of the energy going out of the engine with the exhaust gases. It is a particular object of the invention to provide such an improved twin supercharger with a simpler and more economical attachment to the engine, of a configuration which will allow the construction to be elastic to thermal expansion effects.

Briefly, the objects above setforth are obtained by the combination of the following features:
   the turbine discharge housing is affixed to a mounting surface or panel of the motor body hereinafter referred to as a motor console,
   each of the two exhaust powered superchargers is supported in a "floating" manner from a smaller support surface at the side of the motor by a suspension support in the region of the compressor spiral casing of the individual supercharger,
   the turbine discharge housing consists of several individual parts fastened to each other, namely a box-shaped housing mid-portion with an outer wall bounded by two interrupted side walls and an outflow funnel mounted thereon on the exit side, also two housing side portions, each of which is connected on one side to the housing mid-portion and on the other side to a turbine casing,
   within the turbine discharge housing there is provided down the middle a guiding wall for separately leading, by appropriate stream flow surfaces, the gas streams coming out of the two radial turbines,
   and, finally, at the exit from each radial turbine a diffuser horn of cross section increasing in the stream direction is connected for recovery of outflow energy.

The invention is further described, along with the advantages thereof, by way of illustrative examples with reference to the annexed drawings, in which:

FIG. 2 is a cross section of the equipment of FIG. 1 along the line II—II of FIG. 1;

FIG. 3 is a view of the central portion of the equipment looking into the common turbine discharge as indicated by the arrow III in FIG. 1.

DESCRIPTION OF THE ILLUSTRATED EMBODIMENTS

Figure 1:
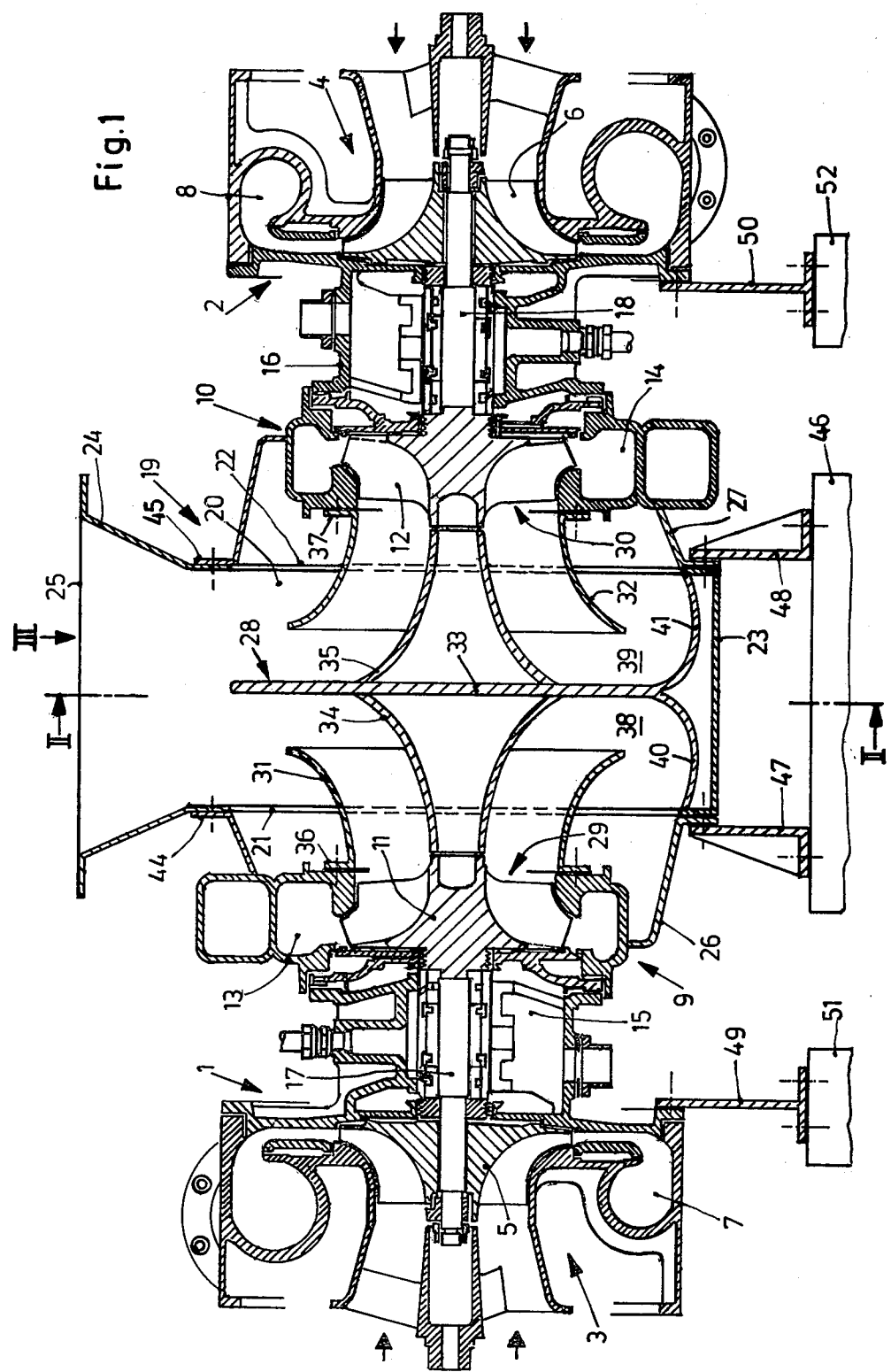
FIG. 1 is a longitudinal cross section through a supercharger equipment according to the invention.

Exhaust-driven turbo-superchargers 1 and 2 that are of identical construction, each having a radial compressor 3,4 equipped with a compressor rotor 5,6 and a compressor spiral casing 7,8, a radial turbine 9,10 equipped with a turbine rotor 11, 12 and a turbine casing 13,14, and, between the radial compressor and the radial turbine, a bearing casing 15,16. The two exhaust-driven superchargers 1,2 are coaxially arranged and of opposite direction of gas flow. The latter is evident from the mirror image relation of the cross sections of the two units in FIG. 1. A common turbine discharge housing 19 serves both of the radial turbines 9 and 10 into which the exhaust gas coming out of both radial turbines 9 and 10 is introduced in a manner further described below. The turbine discharge housing 19 is disposed between the two turbo-superchargers 1 and 2 and at the same time serves also as the common structural connection holding them together.

According to the invention the turbine discharge housing 19 consists of several individual parts connected together. The first of these is an outer wall 23 closing off the interior at one end adjacent to the mounting and having two side walls 21 and 22 broken through as shown in FIG. 1 and also having, at the end away from the motor, an outflow funnel 24. The exit opening of the funnel 24 is shown round in FIG. 3, but it may also be rectangular in cross section if desired for reasons of construction or of flow dynamics in particular cases. Other components of the turbine discharge housing 19 are the two housing parts 26 and 27 each of which is connected on one side to the box-shaped mid-portion 20 of the housing, covering a side opening thereof, and on the other side to one of the turbine casings 13,14 respectively belonging to the turbo-superchargers 9 and 10.

There is furthermore provided, according to the invention, a guiding wall 28 extending down the middle of the turbine discharge casing 19 and shaped, in the portion farthest from the exit funnel 24, in a manner for efficient flow guiding, so as to separately lead the gas streams respectively flowing out of the radial turbines 9 and 10 and deflect them toward the discharge funnel 24.

There is also, according to a further feature of the invention, a pair of diffuser horns 31 and 32 flaring outward in the direction of flow at the respective outlets 29 and 30 of the radial turbines 9 and 10, for the purpose of assisting the recovery of energy from the discharge flow for driving the compressors.

As shown in FIGS. 1 and 2 the guiding wall 28 concludes a plane median wall 33 standing vertical and perpendicular to the supercharger axis. The median wall 33 carries funnel-shaped tubular center plugs 34 and 35 on opposite sides, both coaxial to the supercharger axis. Each of these hollow center plugs 34 and 35 tapers down concavely from a maximum diameter at the place of attachment to the median wall 33 to a minimum diameter equal to the inner diameter of the respective exits 29 and 30 of the radial turbines 9 and 10, penetrating in this manner the interior space enclosed by the respective diffuser horns 31 and 32 pertaining to the respective turbines 9 and 10. In the illustrated case, the profile of the flare of the opposed surfaces of the diffuser horns 31 and 32 and the guiding tubular plugs formed by funnel shaped guide tubes 34 and 35 is hyberbolic and the space between widens out slightly, but in the simplest case the profile could be rectilinear at least in the region of mutual overlap, where there should be uniform or nearly uniform spacing between plug and horn.

Each of the diffuser horns 31 and 32 has a fastening flange 36,37 by which it is affixed to the corresponding turbine casing 13,14 at the locations designated by short dash-dot lines. The diffuser horns 31 and 32 have an axial dimension that is about two thirds of the spacing between the corresponding turbine casing 13,14 and the median 33. The housing mid portion 20 is divided into two discharge flow spaces 38 and 39 by the median wall 33 that extends out to about the beginning region of the discharge funnel 24. At the upstream end of the median wall 33 are diverging bent guiding wall portions 40 and 41 that are connected to the side walls 21 and 22 and provide deflection in a flow-favoring manner for the gas streams coming out of the two diffuser horns 31 and 32.

Figure 4:
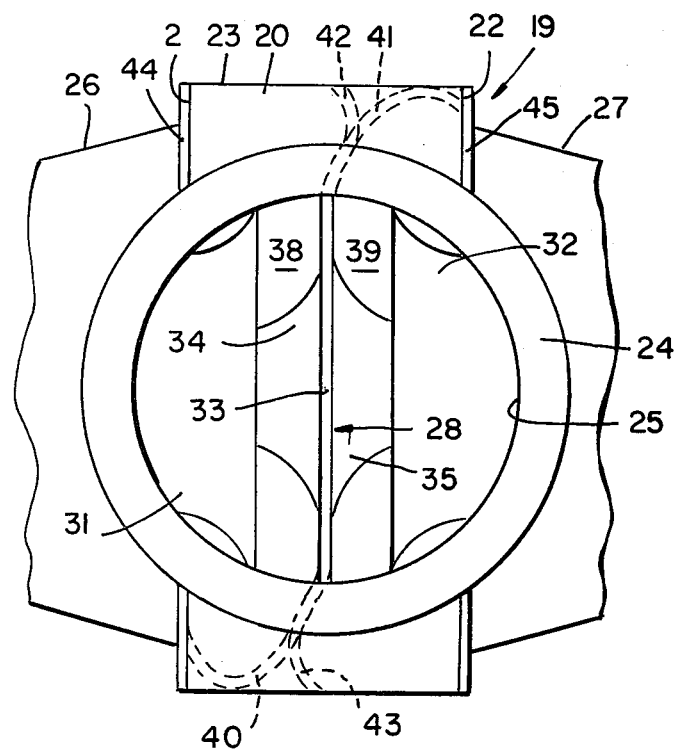
FIG. 4 is a view, like FIG. 3 of a modified form of twin turbo-supercharger unit according to the invention.

In the illustrated example, as shown in FIGS. 1 and 2, the median wall 33 is in the form of a through-going flat wall. As shown in the modified embodiment illustrated in FIG. 4, however, it can have flow-favoring curved wall portions 42 and 43 that are so constituted that in the discharge spaces 38 and 39 a discharge flow cross section that is increasingly large is provided in the vortex direction of the flow out of each of the turbines.

The parts 33, 34, 35, 40 and 41 of the guiding structure designated 28 as a whole are individually preshaped and then welded together. The guiding structure 28 can of course also be made integral and made as a steel or spheroidal graphite iron casting.

The two housing side parts 26 and 27 are constituted as pot-shaped elements having their bottoms and conical walls partly cut out to fit the corresponding turbine casing 13 and 14 so they can be fitted onto the turbine casings and connected thereto. Each of these housing side parts 26 and 27 is equipped with a fastening flange 44, 45 at its periphery running parallel to the corresponding side wall 21, 22 of the housing mid-portion 20. The fastenings by screws are again indicated by short dash-dot lines. The openings in the side walls 21 and 22 of the housing mid-portion are centered on the open cross section of the two housing side parts 26 and 27 where these fit against the housing mid-portion 20 in the fastening plane. The two housing side parts 26 and 27 are identically made. They can be separately made of sheet steel and respectively welded to the turbine casings 13 and 14. Again, as an alternative to such construction, they can both be made integral with the turbine casing, in which case the casing would be made by casting.

The turbine discharge housing 19 is fastened, according to the invention, to a motor console 46 provided on the side of the internal combustion engine, by means of support elements which can, as shown in FIG. 1, be provided as two angle brackets 47 and 48 dimensioned for strength and reinforced by ribs. The turbine discharge housing 19 is firmly screwed onto the brackets so that it is held at the desired spacing from the motor console 46 and from other parts of the internal-combustion engine not shown in the drawings. The angle brackets 47 and 48 are firmly screwed to the motor console 46 and their outer ends lie outside the fastening flanges 44 and 45 of the respective housing parts 26 and 27, where the turbine discharge housing 19 is screw-fastened to the brackets 47 and 48, the position of the screws being again shown by short dash-dot lines. Alternatively, of course, the support elements for fastening the turbine discharge housing 19 to the motor console 46 could be formed integrally on the housing side portions 26 and 27 or on the housing mid portion 20 or welded or otherwise intimately connected thereto. In that case the support elements could have a shape similar to that of the angle brackets 47 and 48. On the other hand, the support elements 47 and 48, instead of being provided as already discussed, could be welded or otherwise intimately bonded onto the motor console 46 or be made integrally therewith.

According to a further feature of the invention, the two exhaust-powered turbo-superchargers 1 and 2 in addition to being held by the turbine discharge 19, which as already mentioned, is the common structural connection holding the two turbo-superchargers together, are both held in a floating or a flying manner in the region of its compressor spiral casing 7, 8 on respective supports 49, 50 bracing them on respective application surfaces at the side of the motor. These support-application surfaces can be provided, as illustrated in FIG. 1, on separate laterally attached consoles 51 and 52. As a further alternative, however, it is also possible to provide the motor console 46 in a form sufficiently wide so that not only the brackets 47 and 48 but also the laterally extending supports 49 and 50 for holding one side of each of the spiral casings 7 and 8 can be supported.

As shown in FIG. 1 a connection suitable for the purpose of a thermally elastic mounting is provided by a screw connection at the end of the respective lateral supports 49, 50 at the transition or connection region between the respective compressor spiral casings 7, 8 and bearing casings 15, 16 of the exhaust powered superchargers 1 and 2. In the simplest case, correspondingly dimensioned T brackets or angle brackets can be used for this purpose that are fastened to the compressor spiral casing 7, 8 or the bearing casing 15, 16 on the one hand, and to the corresponding motor consoles 51 and 52 by screws placed as indicated by the dash-dot lines.

The twin supercharger construction according to the present invention has a number of important advantages. First, as a result of the separate discharge spaces provided by the median wall 33 and particularly the cooperation of the diffuser horns 31 and 32, the tubular guide plugs 34 and 35 and the median wall itself, energy losses in the flow of gas are mitigated and a part of the dynamic energy of the gas stream coming out of the radial turbines 9 and 10 is converted into a static pressure in a short length of flow so that the further flow of gas is supplied to the discharge passage connected to the discharge funnel 24 with a uniform distribution of velocity. This incidentally produces, by virtue of the invention, the recovery of pressure that contributes substantially to the operation at higher efficiency of the two exhaust-driven turbo-superchargers. In the second place, the connection of the two superchargers 1 and 2 together by the turbine discharge housing 19 provides a suspended support and a disposition of the equipment alongside an internal-combustion engine of relatively short axial length, composed of parts that are relatively simple to fashion and therefore, economical to manufacture.

Although the invention has been described with reference to particular illustrative examples, it will be recognized that variations and modifications are possible within the inventive concept.

We claim:

1. A twin turbo-supercharger unit forming a component of an internal-combustion engine having two supercharger units of substantially identical construction, each including a radial-flow compressor and a radial-flow turbine mounted coaxially and driven to provide opposite directions of flow by power provided from the exhaust gas output of said engine, into a common turbine discharge housing disposed between the two exhaust-driven turbo-superchargers and serving also for connecting the two superchargers together, said twin turbo-supercharger further having an improvement which comprises:

supporting elements (47,48) rigidly fastening said turbine discharge housing to a mounting component body (46) provided laterally on said engine;

support brackets (49,50) extending laterally from said engine for supporting said respective turbo-superchargers (1,2) of the twin unit at a distance from said engine in a floating manner from portions (51,52) of said engine providing mounting surfaces on a side of said engine;

said turbine discharge housing (19) consisting of a plurality of parts, including a box-shaped housing mid-portion (20) having side apertures centered on the axis of the superchargers and a funnel-shaped discharge portion (24) and two housing side parts (26,27) fastened to said housing mid-portion (20) around the edges of the respective side apertures thereof and also fastened to the respective casings (13,14) of said turbines;

a guiding structure within said turbine discharge housing (19) comprising guiding wall means (33,34,35,40,41,42,43) including a median wall (33) for separately leading the respective gas streams issuing from said radial turbines towards said median wall, and diffuser horns (31,32) at the respective outputs (29,30) of said radial turbines (9,10) which flare outward in the direction of flow for cooperating with said guiding structure to produce a static pressure for improving the recovery of exhaust gas energy by said turbo-superchargers.

2. A twin turbo-supercharger unit as defined in claim 1, in which said guiding structure (28) includes a median wall (33) subdividing the interior of said housing mid portion (20) into two discharge spaces (38, 39) extending out to the neighborhood of said funnel-shaped discharge opening (24), and also a pair of funnel-shaped guide tubes (34, 35) on opposite sides of said median wall (33) having their widest diameter portions against said median wall and projecting so as to extend into the space enclosed by said diffuser horns (31, 32) with their ends having a diameter corresponding to the internal diameter of the respective outlets (29, 30) of said radial turbines (9, 10).

3. A twin turbo-supercharger unit as defined in claim 2, in which said median wall (33) has bent wall portions (42,43) so shaped that in both discharge flow spaces (38, 39) a flow cross section is provided that becomes larger in the vortex direction of the flow.

4. A twin turbo-supercharger unit as defined in claim 2, in which the profile of said diffuser horns (31, 32) and of said guide tubes (34, 35), in a plane passing through the turbo-supercharger axis, is hyperbolic and maintains approximately the same spacing of diffuser horn to guide tube in the region of their overlap.

5. A twin turbo-supercharger unit as defined in claim 2, in which each said diffuser horn (31, 32) has a fastening flange (36, 37) by which it is screwed onto a casing (13, 14) of the corresponding radial turbine (9, 10) and in which each said diffuser horn is of an axial length that is substantially equal to two thirds of the spacing between said casing (13, 14) of said turbine and said median wall (33).

6. A twin turbo-supercharger unit as defined in claim 2, in which said guiding structure (28) is integrally constituted in the form of a ferrous metal casting.

7. A twin turbo-supercharger unit as defined in claim 2, in which said guiding structure (28) is an assembly of parts welded together.

8. A twin turbo-supercharger as defined in claim 1, in which said housing side parts (26, 27) are constituted as pot-shaped pieces having their bottoms and side walls partly cut out so as to fit respective casing (13, 14) of said radial turbines (9, 10) to which they are connected and are also respectively equipped with peripheral fastening flanges (44, 45) for securing them by screws to said housing mid-portion (20).

9. A twin turbo-supercharger as defined in claim 8, in which said housing side parts (26, 27) are of sheet steel and are welded onto the respective turbine casings (13, 14).

10. A twin turbo-supercharger unit as defined in claim 8, in which said housing side parts (26, 27) are of identical shape.

11. A twin turbo-supercharger unit as defined in claim 1, in which said housing side parts (26, 27) are respectively made integral with a casing (13, 14) of the adjacent radial turbine (9, 10) in a common casting.

12. A twin turbo-supercharger unit as defined in claim 1, in which said common turbine discharge housing (19) is mounted at a predetermined spacing from said mounting component body (46) of said engine by means of interposed angle brackets (47, 48) reinforced by ribs.

13. A twin turbo-supercharger unit as defined in claim 1, in which said support brackets supports (49, 50) are attached to the transition and connection region of the spiral casing (7, 8) of the respective compressors and the bearing casings (15, 16) of the respective exhaust-powered turbo-superchargers (1, 2), whereby a mounting tolerant of heat expansion effects is provided.

* * * * *